United States Patent [19]

Kosarzecki

[11] 4,078,574

[45] Mar. 14, 1978

[54] MODULAR CONTROL VALVE

[75] Inventor: Constantine Kosarzecki, Schaumburg, Ill.

[73] Assignee: Modular Controls Corporation, Villa Park, Ill.

[21] Appl. No.: 734,716

[22] Filed: Oct. 22, 1976

[51] Int. Cl.² ............................................. F16K 27/00
[52] U.S. Cl. ................................... 137/269; 251/366; 137/454.5
[58] Field of Search ..................... 137/269, 271, 454.2, 137/454.6, 454.5

[56] References Cited

U.S. PATENT DOCUMENTS 3,990,468   11/1976   Arvin .................................. 137/269

Primary Examiner—Alan Cohan

Attorney, Agent, or Firm—Olson, Trexler, Wolters, Bushnell & Fosse

[57] ABSTRACT

A modular hydraulic valve is disclosed, which comprises a valve manifold and a number of valve cartridge elements disposed at least partly within cavities defined in the valve manifold. To encourage interchangeability and reduce manufacturing costs, each cavity includes a number of axially aligned steps of progressively decreasing diameter. The outermost steps of each cavity is defined by a diameter identical with the outermost step diameter of all other cavities, regardless of whether those other cavities define one or more than one additional steps. Likewise, the second outermost step in each cavity is defined by another diameter which is substantially identical with the second step diameter of all other cavities having two or more steps.

12 Claims, 8 Drawing Figures

MODULAR CONTROL VALVE

BACKGROUND OF THE INVENTION

This invention relates generally to hydraulic valves and more particularly concerns multi-function hydraulic manifold valves which can be assembled at low cost from a selection of parts to perform a wide variety of different functions.

A manufacturer of modern, complex industrial devices often requires the use of correspondingly complex hydraulic systems. For example, modern hoisting cranes often utilize hydraulic systems which extend crane boom elements in a given sequence to provide maximum boom support. This sequencing action requires a complex hydraulic system and correspondingly complex hydraulic valving. In other areas, the steering gear for crawler tractors and the like can also require complex hydraulic systems.

Accordingly, modern hydraulic system engineering makes extensive use of multi-function hydraulic valves which can provide a number of hydraulic system actions, sometimes in a sequential order. The market for such valves encourages the design of valves which are inexpensive in offered cost, yet reliable and rugged in operation and inexpensive to maintain.

Recently, modular control valves assembled from interchangeable components have met with great commercial success. These valves permit the valve manufacturer and user to obtain a wide variety of valve capabilities yet the assembled valves themselves are of relatively low cost and compact, reliable design.

It is the general object of the present invention to provide a multi-function hydraulic manifold valve in which the valve manifold can accommodate a variety of individual valve cartridges or elements to provide a wide variety of valve function sequences.

It is a more specific object of the invention to provide such a manifold valve in which a number of valve cartridges or elements can be interchangeably secured within and upon any given cavity to correspondingly change the total valve function.

Another specific object is to provide a valve manifold in which the cavity can be formed in a standardized manner to accommodate a relatively wide variety of valve cartridges or elements.

Yet another object is to provide a valve manifold in which a two-step valve cavity can be easily and inexpensively extended to accommodate a three-step or four-step valve cartridge element.

A further object is to provide a valve manifold which can be manufactured by relatively standardized manufacturing techniques. An associated object is to provide such a valve manifold which can be finished at relatively low cost and offered at a correspondingly attractive commercial price.

Other objects and advantages of the invention will become apparent upon reading the following detailed description and upon reference to the drawings. Throughout the drawings, like reference numerals refer to like parts.

DETAILED DESCRIPTION

While the invention will be described in connection with a preferred embodiment, it will be understood that it is not intended to limit the invention to this embodiment. On the contrary, it is intended to cover all alternatives, modifications, and equivalents as may be included within the spirit and scope of the invention as defined by the appended claims.

Figure 1:
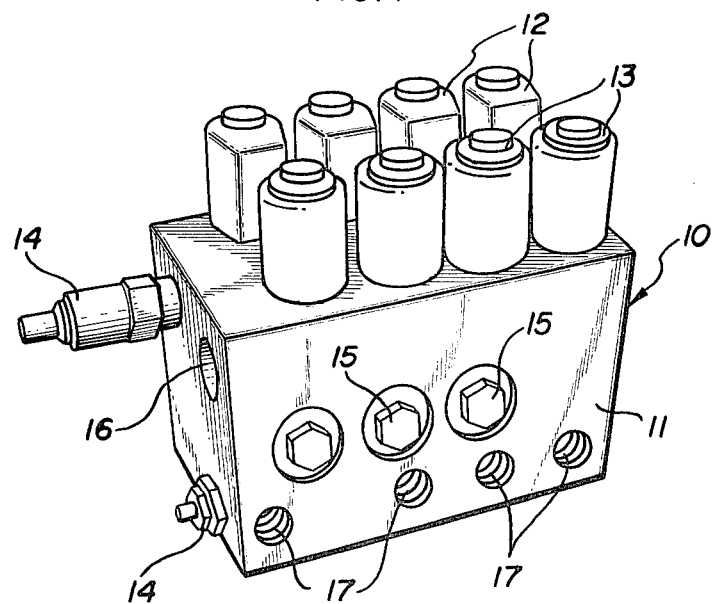
FIG. 1 is a perspective view showing, in its general aspect, a multi-function hydraulic manifold valve embodying the present invention.

Turning first to FIG. 1, there is shown a modular, multi-function hydraulic manifold valve 10. In general, this manifold valve 10 can be considered to include a manifold 11, which can be constructed from a block of steel, aluminum or similar material. Within and upon this manifold 11 are installed a number of valve cartridges 12, 13, 14 and 15. It will be understood that each cartridge can act as a separate valve element; for example, the cartridges 12 can be electrically actuated solenoid valve cartridges; the cartridges 13 can be pressure compensator valve cartridges of various types, and the cartridges 14 and 15 can be adjustable relief valve cartridges. Other valve cartridges of appropriate design can be offered, including by way of example needle valve flow limiting device cartridges, manual rotary valve cartridges, sequencing valve cartridges, priority flow regulator cartridges, check valve cartridges, shuttle valve cartridges and others.

By properly selecting these valve cartridges and interconnecting the various cartridges and corresponding cartridge-accepting cavities within the manifold block 10, a hydraulic valve can be provided to control or operate a hydraulic system of relatively great complexity. This cartridge interconnection can be provided by passageways 16 drilled or otherwise formed within the manifold 11. If desired, the passages 16 can be tapped to form threads 17 for connecting hoses or other conduits leading to other valves or system components.

Figure 2:
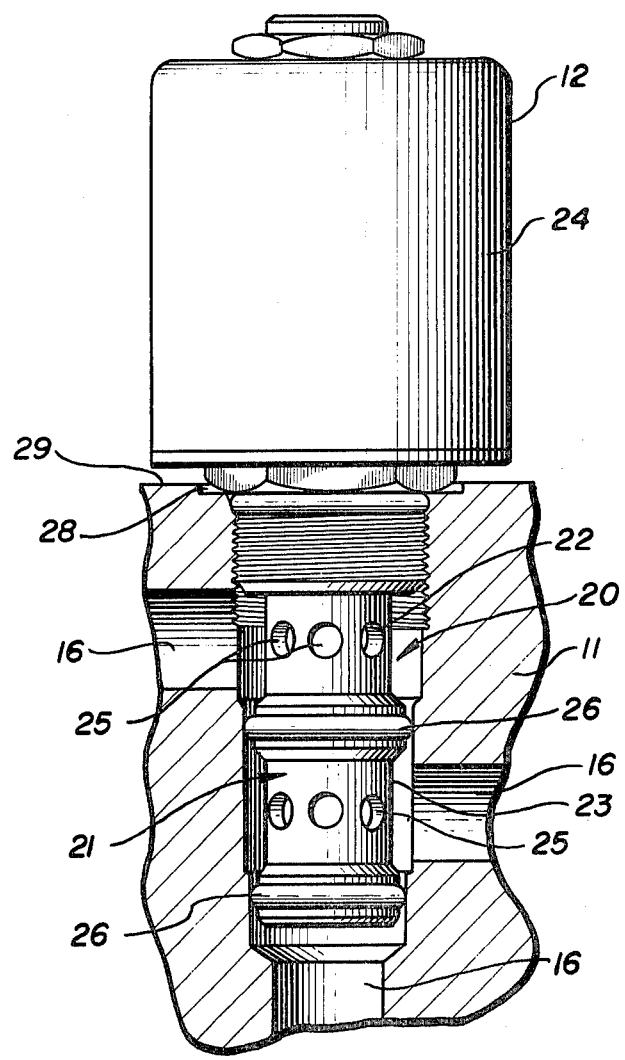
FIG. 2 is a fragmentary view of a typical valve cartridge as it appears when installed in and upon a typical valve cartridge-accepting cavity.

In FIG. 2, a typical valve cartridge 12 of the solenoid type and the accompanying valve cartridge cavity 20 are illustrated. Here, the cartridge 12 is provided with a leg 21 including two valve steps 22 and 23. When a valve solenoid head 24 is actuated, a valve spool (not shown) operates to admit or halt hydraulic fluid flow through ports 25, and thereby correspondingly halts or admits fluid flow to the passages 16 formed within the manifold body 11. O-rings 26 isolate the various valve steps 22 and 23 from one another within the cavity 20 for proper operation.

Figure 3:
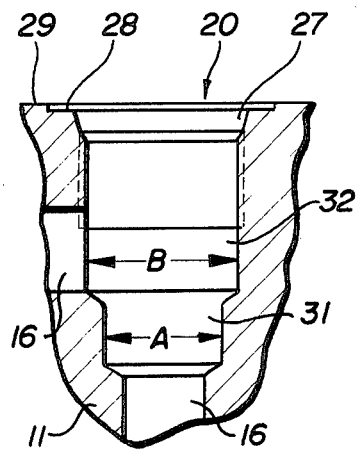
FIG. 3 is a fragmentary sectional view similar to FIG. 2 and showing a two-step valve cartridge-accepting cavity constructed in accordance with the prior art.
Figure 4:
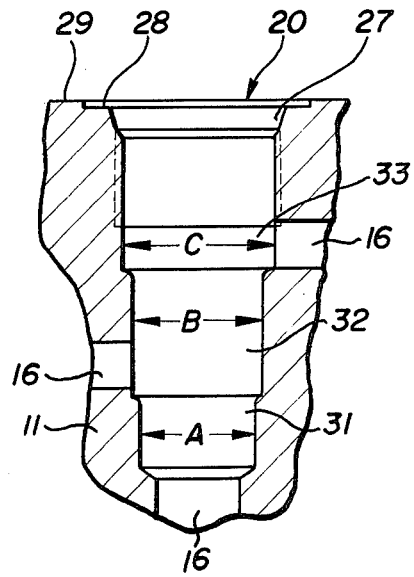
FIG. 4 is a fragmentary sectional view similar to FIG. 3 and showing a three-step valve cartridge-accepting cavity constructed according to the prior art.
Figure 5:
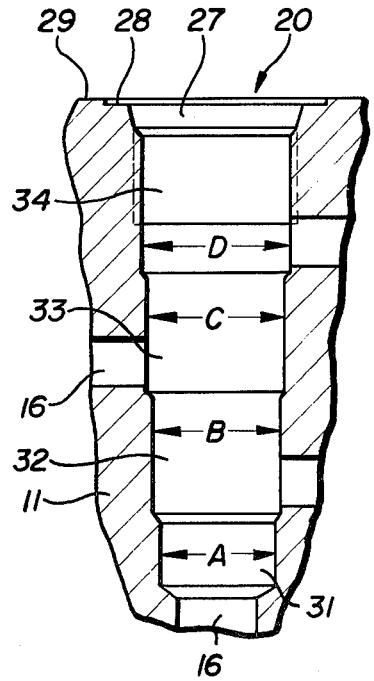
FIG. 5 is a fragmentary sectional view similar to FIGS. 3 and 4 and showing a four-step cartridge-accepting cavity constructed according to the prior art.
Figure 6:
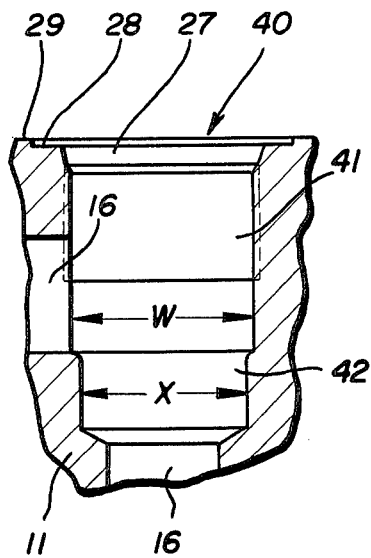
FIG. 6 is a fragmentary sectional view similar to FIG. 3 showing a two-step valve cartridge-accepting cavity constructed in accordance with the principles of the present invention.

Reference to FIGS. 3-8 inclusive show that these valve manifold cavities comprise a number of axially aligned and adjacent bores or steps of decreasing diameters. For use with the two-step valve cartridges such as that shown in FIG. 2, a corresponding two-step cavity such as shown in FIGS. 3 and 6 can be provided. For three-step cartridges, three step cavities (FIGS. 4 and 7) are used; for four-step cartridges, four-step cavities (FIGS. 5 and 7) are used. Regardless of the cavity form or arrangement, a cavity mouth 27 and countersunk platform 28 are provided at the cavity edge 29 for proper cartridge mounting.

In accordance with the principals of the prior art illustrated in FIGS. 3-5 collectively, the innermost cavity step 31 was always defined by a given internal diameter A. Correspondingly, the next innermost cavity step 32 was always defined by a somewhat larger internal diameter B. If the cavity 20 was of the three-step or four-step variety, the third innermost cavity step 33 was always provided with a given internal diameter C, and the fourth innermost cavity step 34 was always provided with a yet larger internal diameter D.

While providing proper valve cartridge operation, it will be noted that the maximum internal diameter of each cavity 20 varied according to the number of steps formed therein. For example, the two step cavity 20 shown in FIG. 3 was provided with a cavity 32 adjacent the manifold surface 39 which had a maximum internal diameter B. For a three-step cavity, the cavity 33 adjacent the manifold edge 39 utilized a maximum diameter C; in a four-step cavity that cavity 34 adjacent the manifold 39 utilized a maximum diameter D.

Figure 7:
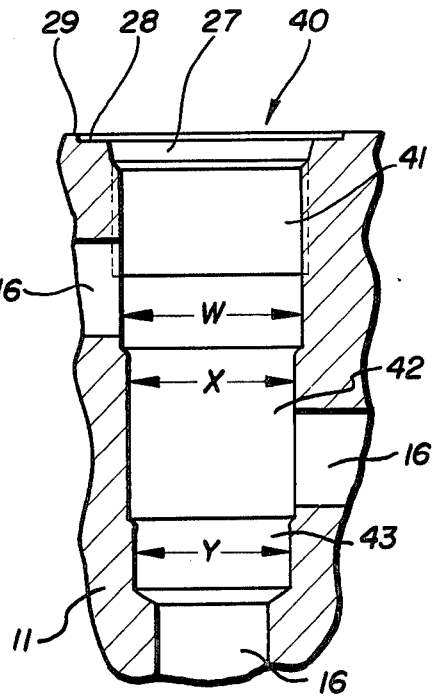
FIG. 7 is a fragmentary sectional view similar to FIG. 6 and showing a three-step valve cartridge-accepting cavity constructed in accordance with the principles of the present invention.
Figure 8:
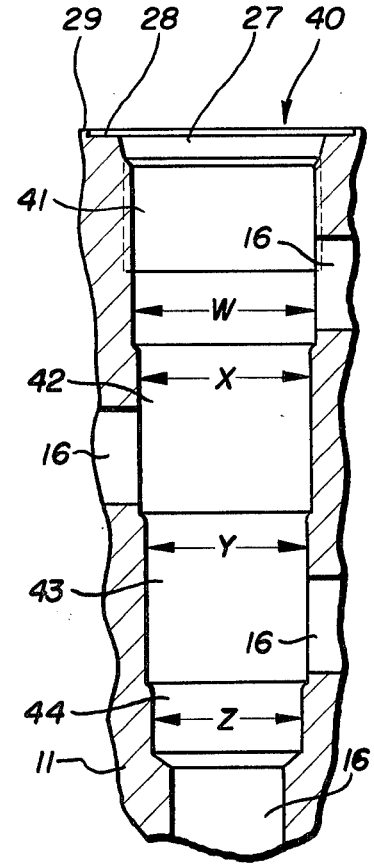
FIG. 8 is a fragmentary sectional view similar to FIGS. 6 and 7 and showing a four-step valve cartridge-accepting cavity constructed in accordance with the principles of the present invention.

In accordance with the principals of the present invention, valve cavity 40 manufacturing costs can be reduced and valve element interchangeability can be assisted by providing an outermost valve cavity step 41 having maximum internal diameter W, regardless of whether a two-step, three-step, or four-step valve cavity is formed, as illustrated in FIGS. 6, 7, and 8, respectively. Similarly, immediately adjacent the first cavity step 41, a second outermost cavity step 42 having a maximum internal diameter X is formed. If a third outermost step 43 is required, this step can be easily formed axially inwardly of the first two steps 41 and 42. Whether a three-step cavity such as shown in FIG. 7 is required, or a four-step cavity auch as shown in FIG. 8 is required, this third step 43 is formed to a maximum internal diameter Y. To provide maximum interchangeability of valve cartridges and maximum ease of cavity production, the third step 43 of all three-step valve cartridge-accepting cavities such as that shown in FIG. 7, and all four-step cavities as shown in FIG. 8 will be provided with this maximum internal diameter Y. Correspondingly, if a fourth step 44 is required, this step can be easily formed below or relatively axially inwardly of the first three steps 41-43, and is provided with a maximum internal diameter Z.

In accordance with another aspect of the invention, it will be understood that the two-step valve cartridge cavity such as that illustrated in FIG. 6 can be relatively easily and quickly converted to either a three-step cavity such as shown in FIG. 7 or a four-step cavity such as that shown in FIG. 8. To make such conversions, it is only necessary to form a third step 43 and any fourth step 44 required; no alteration of the diameters W and X or other dimensions of the first two steps 41 and 42 are required, as is necessary in the prior art, and as can be envisioned from FIGS. 3-5.

It will also be noted that, if desired, two-step valve cartridges can be inserted in either three-step or four-step valve cavities and will properly operate with little or no alteration of internal valve cartridge structure. Again, such valve insertion cannot be made in the prior art valve cavity structure illustrated in FIGS. 3, 4 and 5. This novel arrangement permits relatively quick alteration of valve cartridges within the corresponding cavities, and permits a corresponding change in the overall function of the total multifunction hydraulic manifold valve at minimum total cost.

The invention is claimed as follows:

1. A modular hydraulic valve, comprising a valve manifold defining a plurality of valve cartridge-accepting cavities, and a plurality of valve elements adapted to be secured at least partly within the cavities, each cavity being defined by a plurality of concentric, axially adjacent steps of decreasing diameters extending inwardly of the manifold surface, at least one such cavity having a different number of steps than another cavity, the outermost step diameter of said one cavity being substantially identical with the outermost step diameter of said other cavity having a differing number of steps.

2. A modular hydraulic valve according to claim 1 wherein said outermost step diameter of said one cavity is substantially identical with the outermost step diameter of more than one other cavity each having a different number of steps than said one cavity.

3. A modular hydraulic valve according to claim 1 wherein said outermost step diameter of said one cavity is substantially identical with the outermost step diameter of all other valve cavities having a different number of steps than said one cavity within said valve manifold.

4. A modular hydraulic valve according to claim 1 including a second outermost step diameter defined in one cavity, said second outermost step diameter being substantially identical with a second outermost step diameter of at least one other cavity having at least two steps, but a different number of steps than said one cavity.

5. A modular hydraulic valve according to claim 4 wherein said second outermost step diameter of one cavity is substantially identical with the second outermost step diameter of a plurality of other cavities each having at least two steps, but a different number of steps than said one cavity.

6. A modular hydraulic valve according to claim 4 wherein the second outermost step diameter of one cavity is substantially identical with the second outermost step diameter of all other valve cavities having a different number of steps than said one cavity within said valve manifold.

7. A modular hydraulic valve according to claim 1 including a third outermost step diameter defined in said one cavity, said third outermost step diameter being substantially identical with a third outermost step diameter defined in at least one other cavity having at least three steps but a different number of steps than said one cavity.

8. A modular hydraulic valve according to claim 7 wherein said third outermost step diameter is substantially identical with the third outermost step diameter of a plurality of at least one other cavity having a different number of steps than said one cavity.

9. A modular hydraulic valve according to claim 8 wherein the third outermost step diameter of one cavity is substantially identical with the third outermost step diameter of all other valve cavities having a different number of steps than said one cavity.

10. A manifold for a multi-function modular hydraulic valve, comprising a manifold body defining a plurality of valve cavities in and on which a plurality of valve cartridge elements can be secured, each cavity being defined by a series of concentric steps of decreasing diameter extending inwardly of the manifold surface, the outermost step diameter of one cavity being substantially identical with the outermost step diameter of at least some other cavities having a different total number of steps than said one cavity, and the second outermost step diameter of said cavity being substantially identical with the second outermost step diameter of at least some cavities having a different total of steps.

11. A manifold valve according to claim 10 wherein said valve cavity includes a third outermost step of diameter smaller than first and second outermost steps, the diameter of said third outermost step being substantially identical with the third outermost step diameter of at least one other valve cavity having three or more steps.

12. A manifold valve according to claim 11 wherein at least one cavity is defined by a fourth outermost step having a diameter smaller than the diameters of said first, second and third steps, the fourth outermost step diameter of one cavity being substantially identical the fourth outermost step diameter of a plurality of cavities in the manifold.

* * * * *